Figure 1:
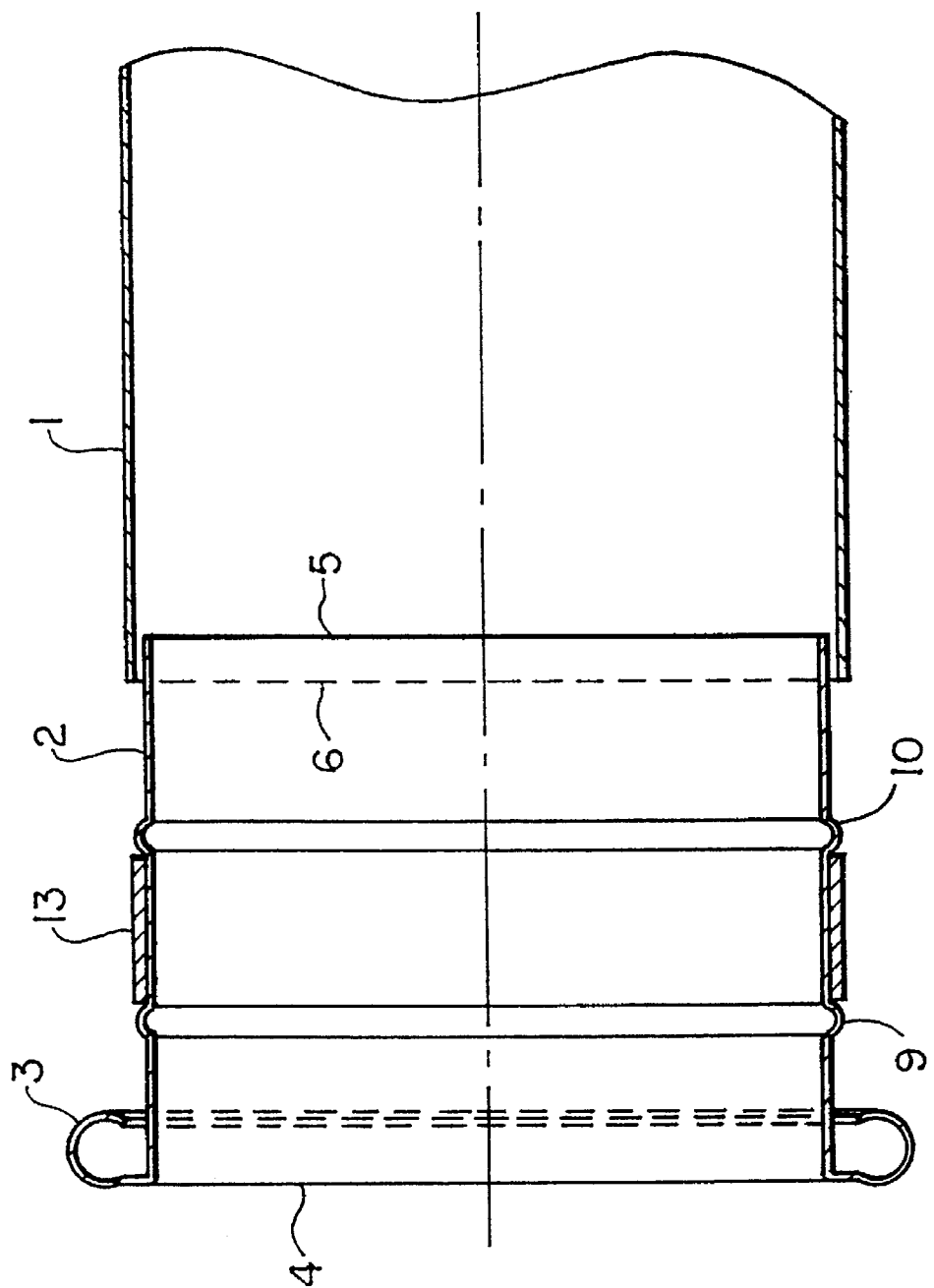

United States Patent [19]
Krichau et al.

[11] Patent Number: 5,649,662
[45] Date of Patent: Jul. 22, 1997

[54] METHOD AND A PIPE ELEMENT FOR PROVIDING A RADIALLY OUTWARDS DIRECTED BEAD AT THE END RIM OF A PIPE

[75] Inventors: Peter Krichau; Werner J. Andresen, both of Haderslev, Denmark

[73] Assignee: Lindab A/S, Haderslev, Denmark

[21] Appl. No.: 436,397

[22] PCT Filed: Nov. 11, 1993

[86] PCT No.: PCT/DK93/00369
§ 371 Date: May 18, 1995
§ 102(e) Date: May 18, 1995

[87] PCT Pub. No.: WO94/12295
PCT Pub. Date: Jun. 9, 1994

[30] Foreign Application Priority Data

Nov. 20, 1992 [DK] Denmark .................. 1393 92

[51] Int. Cl.$^6$ .............. B23K 31/02; G01B 5/28; F16L 9/22
[52] U.S. Cl. .............. 228/128; 228/135; 29/453; 29/523; 156/91; 156/158; 156/293; 138/109; 138/155
[58] Field of Search .................. 228/128, 131, 228/135; 29/525, 453, 523; 156/293, 304.2, 158, 91; 138/109, 155

[56] References Cited

U.S. PATENT DOCUMENTS

| 1,484,968 | 2/1924 | Schlafly | 138/109 |
|---|---|---|---|
| 3,208,136 | 9/1965 | Joslin | 29/523 |
| 3,819,849 | 6/1974 | Baker | 138/109 |
| 3,832,259 | 8/1974 | Van Zon | 156/293 |
| 3,924,883 | 12/1975 | Frank | 29/523 |
| 4,251,094 | 2/1981 | Pinto | 285/382.5 |
| 4,653,542 | 3/1987 | Tascher | 138/109 |

FOREIGN PATENT DOCUMENTS

| 1463587 | 12/1966 | France . |
| 360092 | 9/1922 | Germany . |
| 887896 | 8/1953 | Germany . |
| 2719882 | 4/1977 | Germany . |
| 856610 | 12/1960 | United Kingdom . |
| 1488395 | 10/1977 | United Kingdom . |

*Primary Examiner*—David L. Pirlot
*Assistant Examiner*—Jeffrey T. Knapp
*Attorney, Agent, or Firm*—Weingarten, Schurgin, Gagnebin & Hayes LLP

[57] ABSTRACT

In this method a short pipe element (2) with a radially outwards directed bead (3) at its end rim (4) is inserted into a pipe, and a radially outwards directed bead (7, 8) is rolled in the other end (5) of the pipe element (2) and in the pipe (1), such that the pipe element is fixed inside the pipe. The pipe element (2) may before insertion into the pipe be provided with at least two radially outwards directed beads (9, 10), causing the pipe element after insertion to be tightly clamped and fixed inside the pipe, and the pipe element (2) may over a part of its outer surface be coated with a sealing material (13).

13 Claims, 2 Drawing Sheets

METHOD AND A PIPE ELEMENT FOR PROVIDING A RADIALLY OUTWARDS DIRECTED BEAD AT THE END RIM OF A PIPE

The invention relates to a method of providing a radially outwards directed bead at the end rim of a pipe made from thin plate. The invention furthermore relates to a pipe element to be used when implementing the method.

It is known to provide pipes made from thin plate—for instance spirally wound pipes—with beads or similar flanges at their end rims, which allow two pipes to be connected tightly to each other by means of clamps or similar devices engaging the adjacent beads at the end rims and pulling them against each other or against corresponding sealing surfaces of the clamping device. The manufacture of beads at the end rim of a pipe is performed by flanging the ends of the pipes in powerful special machines at a factory. It has therefore not until now been possible at a later point in time to add beads at the end rims of pipes which have been shortened which is a significant drawback.

The object of the present invention is to provide a method of providing a bead at the end rim of a pipe made from thin plate, thus avoiding the drawback mentioned above.

This is according to the invention achieved by a method of the type mentioned above, characterized by inserting a short pipe element with a radially outwards directed bead at one end rim into the pipe, and by rolling a radially outwards directed bead in the pipe element at its other end and in the pipe, thereby firmly fixing the pipe element inside the pipe.

By utilizing ready-made short pipe elements provided with a bead at the rim of one end, it is only necessary at the building site to insert the pipe element into a shortened pipe, in order to subsequently roll a bead at the end of the pipe element positioned inside the pipe by means of a conventional beading machine. Thus a bead in the pipe wall is also produced, and the engagement of the two overlapping beads causes the pipe element to be firmly fixed inside the pipe.

This method has the further advantage that the described rolling of the bead produces a smooth transition between the pipe and the pipe element, thereby avoiding the generation of noise or pressure loss during transportation of material through the pipe.

According to a preferred embodiment, the pipe element may be provided with at least two radially outwards directed beads before insertion into the pipe, where said beads after the insertion cause the pipe element to be firmly clamped and fixed inside the pipe.

The beads are made such that the diameter of the pipe element measured at the top of a bead substantially corresponds to the inside diameter of the pipe. This assures a tight fit when the pipe element is inserted into the pipe. The beads are placed such that they are separated by a suitably large distance, thereby allowing the pipe element to be guided coaxially into the pipe.

In further embodiments the pipe element may after insertion be spot welded to the pipe, or radially outwards directed embossments may be embossed into the pipe and the pipe element, thus achieving a further fixing of the pipe element inside the pipe.

In other embodiments the pipe element may be coated by a sealing material, which may be an elastic material, preferably rubber or polytetrafluoroethylene (Teflon), or the sealing material may be a mastic.

The sealing material may be placed in advance on the outside of the pipe element. A rubber layer may for instance be attached by bonding or vulcanization, or the sealing material, for instance a mastic, may be sprayed on immediately before the pipe element is joined to the pipe.

A further embodiment is characterized in that an adhesive is applied to a part of the outer surface of the pipe element. Thus a further strengthening of the joint between the pipe element and the pipe is achieved.

The invention also relates to a pipe element for use in performing the method described above, said pipe element being characterized in that it has a radially outwards directed bead at one end rim.

The invention will now be explained in more detail by means of an embodiment and with reference to the drawing, in which FIG. 1 shows a longitudinal sectional view of a pipe element according to the invention, where the pipe element is under insertion into a pipe, FIG. 2 a longitudinal sectional view as in FIG. 1, where the pipe element is fully inserted into the pipe and joined to said pipe by the method according to the invention, and FIG. 3 a partial sectional view in a larger scale showing a radially outwards directed embossment in a pipe joint according to the invention.

In FIG. 1 of the drawing a pipe 1 made from thin plate is shown, where the pipe 1 for instance may be a cut off section of a length of pipe originally provided with beads at its end rim, or it may be a part of a standard pipe fitting such as a T-piece or a pipe bend. The figure further shows a pipe element 2, which in this case is manufactured from thin plate. The pipe element 2 has a bead 3 at one end rim 4, while the other end 5 of the pipe element 2 has been cut off with a straight cut. The pipe element 2 furthermore has two radially outwards directed beads 9 and 10, which are placed with a separation causing pipe element 2 to be guided coaxially into the pipe 1 during the insertion of said pipe element 2.

A rubber layer 13, which in this case is bonded to the pipe, is placed between the beads 9 and 10. The outer dimension of the sealing element is such that it will be in contact with the inner wall of the pipe 1 after insertion into the pipe 1, thus sealing the gap between the pipe element 2 and the pipe 1.

Figure 2:
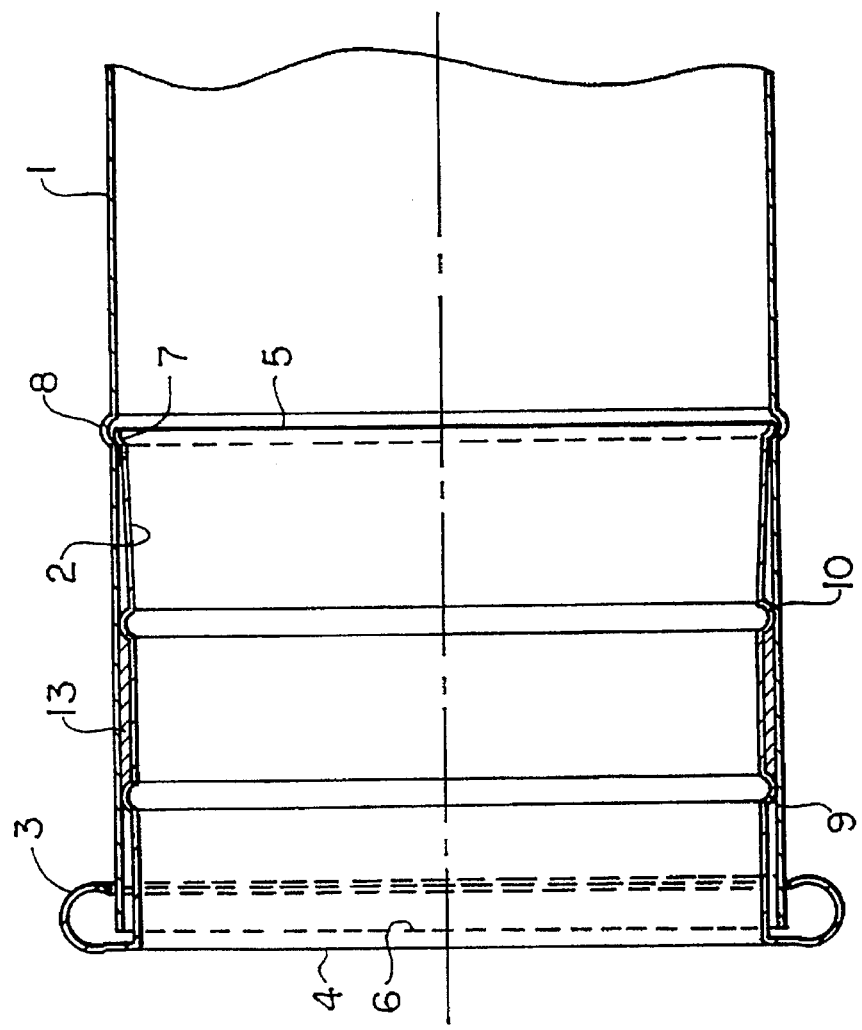

FIG. 2 shows that beads 7 and 8 after insertion of the pipe element 2 into the pipe 1 are rolled in the pipe element 2 and the pipe 1, respectively, at the end rim 5 of the pipe element 2. The rolling is in this case performed such that the bead 7 in the pipe element 2 only is a "half" bead, which assures a good locking of bead 7 in bead 8, while at the same time providing a smooth transition between the inner surfaces of the pipe 1 and the pipe element 2, respectively.

Figure 3:
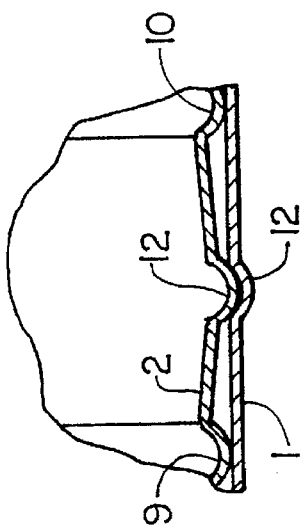

FIG. 3 shows embossments 12 in the pipe element 2 and the pipe 1. The embossments are produced by means of known hand tools.

We claim:

1. A method of providing a radially outwardly directed bead at an extremity of a pipe having a predetermined inner diameter and being made of thin plate, comprising the steps of:

forming a pipe insert element having a wall and first and second extremities, the pipe insert element having a radially outwardly directed bead proximate to the first extremity, the radially outwardly directed bead having a diameter greater than the inner diameter of the pip, the pipe insert element further having at least first and second outwardly directed ridges formed on the wall between the first and second extremities, the first and second outwardly directed ridges each having an outer diameter approximately equal to the inner diameter of the pipe;

inserting the pipe insert element into the pipe such that the second extremity is inside the pipe and the radially outwardly directed bead at the first extremity of the pipe insert element is outside of the pipe, the first and second outwardly directed ridges providing a press fit against the pipe ; and deforming the second extremity of the pipe insert element outwardly against the pipe such that the pipe is outwardly deformed, whereby firmly fixing the pipe insert element inside the pipe and providing a radially outwardly directed bead at the extremity of the pipe.

2. The method of claim 1, further comprising the step of spot welding the pipe element to the pipe after said inserting step.

3. The method of claim 1 further comprising the step of embossing radially outwardly directed embossments in the pipe element and the pipe after said inserting step.

4. The method of claim 1 further comprising the step of coating a part of the outer surface of the pipe element with a sealing material.

5. The method of claim 4, wherein the sealing material is an elastic material selected from the group consisting of rubber and polytetrafluorethylene.

6. The method of claim 4, wherein the sealing material is a mastic.

7. The method of claim 1, further comprising the step of applying an adhesive to a part of the outer surface of the pipe element.

8. A pipe insert element for forming a bead at an extremity of a pipe, the pipe having a predetermined inner diameter, comprising:

a wall defining an inner diameter and an outer diameter, said outer diameter of said wall being less than the inner diameter of the pipe, said wall having first and second extremities such that said first extremity is distal from said second extremity;

a radially outwardly directed bead disposed proximate to said first extremity of said pipe insert element, said radially outwardly directed bead having a diameter greater than the inner diameter of the pipe;

at least two separate radially outwardly directed ridges formed on said wall of said pipe insert element between said first and second extremities, said ridges each having an outside diameter approximately equal to the inside diameter of the pipe; and an outwardly directed deformation formed after insertion of said pipe insert element into the pipe, said deformation being proximate to said second extremity of said pipe insert element and defining a diameter greater than the inner diameter of the pipe, said outwardly directed ridges facilitating securing of said pipe insert element in the pipe by providing a press fit between said pipe insert element and the pipe.

9. The pipe element of claim 8, further including an adhesive applied to a portion of the outer surface of said pipe element.

10. The pipe element of claim 8, wherein said pipe element is made of a material selected from the group consisting of steel, aluminum, and plastic.

11. The pipe element of claim 8, wherein a portion of the outer surface of said pipe element is coated with a sealing material.

12. The pipe element of claim 11, wherein said sealing material is an elastic material selected from the group consisting of, rubber and polytetrafluorethylene.

13. The pipe element of claim 11, wherein said sealing material is a mastic.

\* \* \* \* \*

UNITED STATES PATENT AND TRADEMARK OFFICE
CERTIFICATE OF CORRECTION

PATENT NO. : 5,649,662
DATED : July 22, 1997
INVENTOR(S) : Peter Krichau, et al.

It is certified that error appears in the above-identified patent and that said Letters Patent is hereby corrected as shown below:

Column 1, line 63, "(Teflon)" should read --(Teflon®)--.

Column 2, line 2, "Joined" should read --joined--.

Column 2, claim 1, line 61, "of the pip," should read --of the pipe,--.

Signed and Sealed this

Eighteenth Day of August, 1998

Attest:

BRUCE LEHMAN

Attesting Officer

Commissioner of Patents and Trademarks